March 20, 1962 V. B. PETERSEN 3,025,998
BABY FOOD CARRIER
Filed March 18, 1960 2 Sheets-Sheet 1
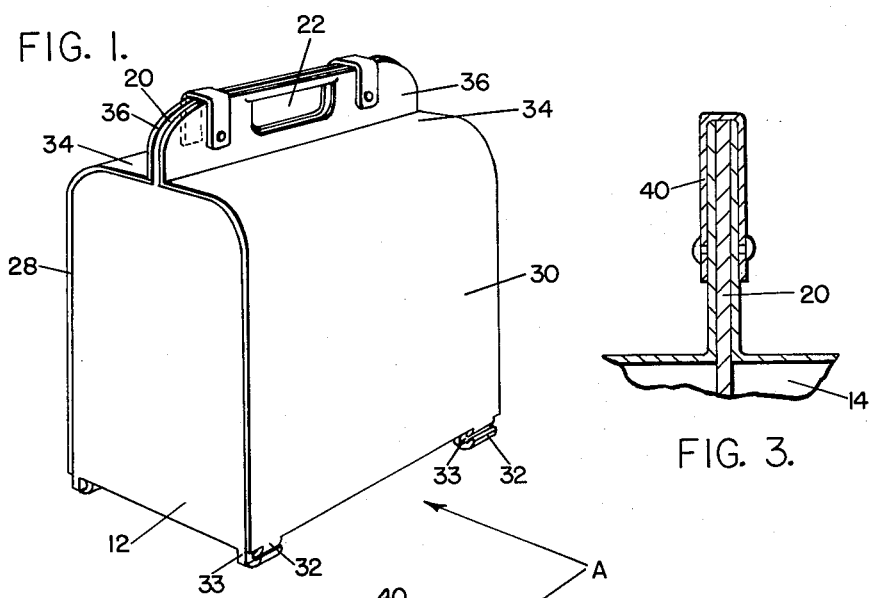
FIG. 1.
FIG. 3.
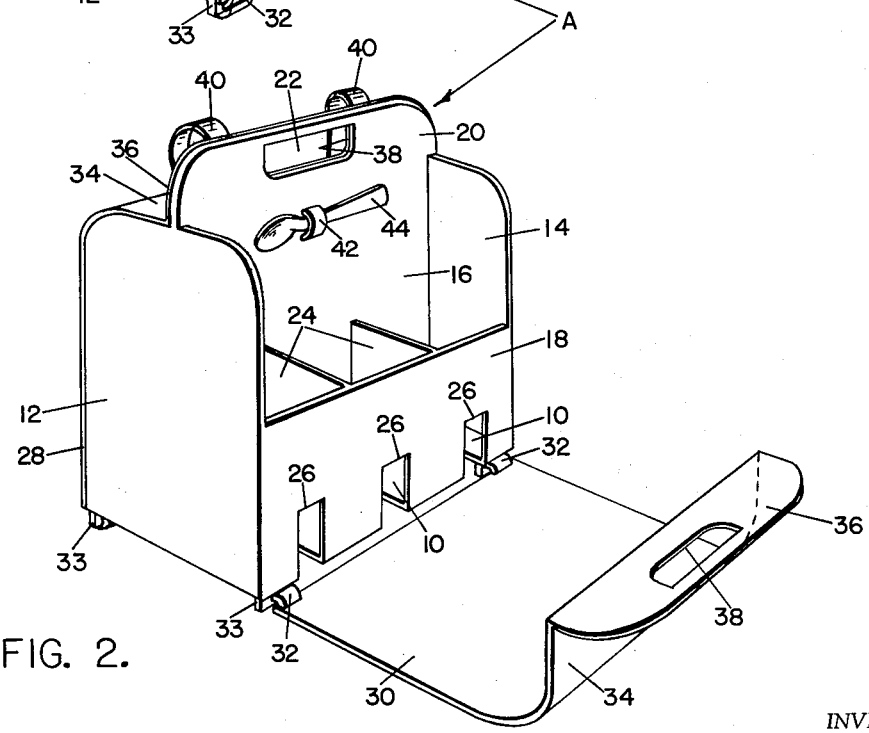
FIG. 2.
INVENTOR;
VERNON R. PETERSEN.
BY
ATTORNEY March 20, 1962 V. B. PETERSEN 3,025,998
BABY FOOD CARRIER Filed March 18, 1960 2 Sheets-Sheet 2

INVENTOR:
VERNON R. PETERSEN.

BY
ATTORNEY

United States Patent Office 3,025,998
Patented Mar. 20, 1962

3,025,998
BABY FOOD CARRIER
Vernon B. Petersen, 2857 Vanderbie Road,
St. Paul, Minn.
Filed Mar. 18, 1960, Ser. No. 16,066
6 Claims. (Cl. 220—102)

This invention relates to carriers for food containers and more particularly relates to a food carrier for cans of food and milk bottles such as are needed when traveling with a small infant.

It is well known that when traveling with an infant it is necessary to carry a ready supply of bottles containing a milk formula or other liquid. Also additional food packaged in small cans is often in a baby's diet and when traveling it often is an inconvenience to carry such items in a single bag containing other infant necessities.

With these thoughts in mind this invention contemplates a carrier for transporting formula bottles and small cans of food in a manner enabling them to be transported easily and to be readily accessible when needed.

A feature of this invention is the provision of a carrier which may be constructed of semi-rigid polyethylene or similar material and be very inexpensive to produce.

Another feature of this invention is to provide a food carrier having compartments which are made readily accessible when small cans of food are stored therein by providing slots in the bottom and outer wall of each compartment thereby enabling a person to insert a finger underneath the edge of a can of food and lift it upwardly so that it might be removed from its compartment.

Other novel features and advantages will become apparent from the following description taken in connection with the drawings wherein:

FIGURE 1 is a perspective view of one embodiment of my invention.

FIGURE 2 is a perspective view of the embodiment shown in FIGURE 1 showing a closure panel in an open position.

FIGURE 3 is a vertical sectional view of the handle portion of the embodiment shown in FIGURES 1 and 2.

Figure 4:
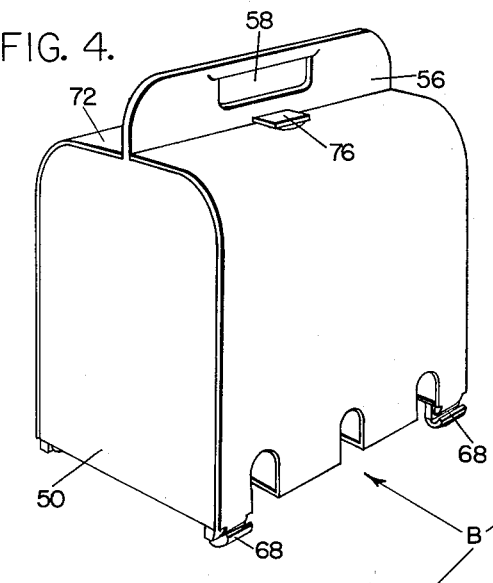
FIGURE 4 is a perspective view of an additional embodiment of my invention.

Referring to the drawings and particularly to the embodiment illustrated in FIGURES 1, 2 and 3 there is here shown a carrier A having a generally rectangular bottom panel or base 10 marginally connected along opposite edges to end walls 12 and 14. A central partition 16 is secured medially between the remaining opposite edges of the base connecting the end walls and connected to the base forming a carrier divided into two parts. Each side of the carrier is provided with a side wall such as the wall 18 which is secured to the base along the lower edge thereof and connected to the end walls 12 and 14. These side walls extend upwardly approximately one half the height of the end walls as seen in FIGURE 2.

The upper end 20 of the central partition extends above the top edges of the end walls to constitute a handle portion. A hand hole 22 extends through the portion 20 to permit the device to be lifted.

The space between each side of the central portion and the side walls 18 is compartmentalized by a plurality of transverse panels 24 which are secured to the base, side walls and the central partition.

Each compartment is provided with a right angular slot 26 which is disposed in adjoining portions of the side walls and the base from a point at the junctures therebetween. These slots are provided to facilitate removal of small cans of food, the top of which might be lower than the top edges of the panels 24 and the side walls 18. A person may insert a finger into a slot and beneath the lower edge of the can and slide the can upwardly out of the compartment.

The carrier is further provided with a pair of closure panels 28 and 30 which are hinged to the base along the lower side wall edges of the carrier. The hinge means includes spaced arcuate hook-like tabs 32 which are integral with or connected to the lower edge of each of the panels 28 and 30 and are inserted through slots 31 formed in legs 33 projecting downwardly from the lower surface of the base. The legs 33 form supports for the carrier.

Cover portions 34 of each of the panels 28 and 30 are disposed at right angles to the panels 28 and 30 and extend inwardly towards the handle portion 20 of the central partition. Handle flanges 36 are connected to the cover portions 34 and extend parallel to and in face contact with the portion 20. Apertures 38 in the flanges 36 are arranged to register with the aperture 22 in the handle portion 20 in closed condition of the carrier. Clasp or locking means such as the straps 40 may be utilized to secure the closure panels 28 and 30 against the central partition. The panel 16 or one of the end walls 12 or 14 of the carrier is also provided with a loop 42 for holding a spoon 44 or the like.

Figure 6:
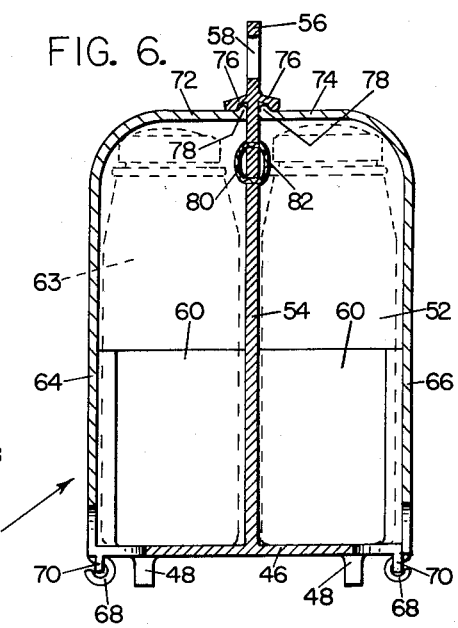
FIGURE 6 is a vertical sectional view of the embodiment shown in FIGURES 4 and 5.
Figure 7:
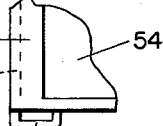
FIGURE 7 is a fragmentary view of the means for hingedly connecting the closure panel to the base portion of the invention.
Figure 5:
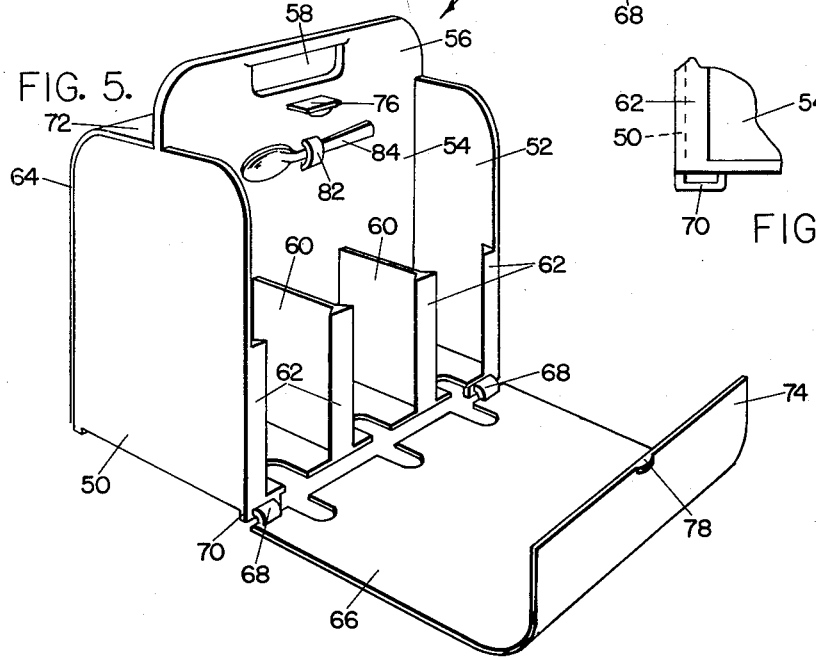
FIGURE 5 is a perspective view of the embodiment illustrated in FIGURE 4 showing one closure panel in an open position.

The embodiment illustrated in FIGURES 4 through 7 is indicated generally by the letter B and includes a generally rectangular base 46 provided with a plurality of spaced legs 48. End walls 50 and 52 are secured to the base or formed integral therewith. A central partition 54 connects the end walls 50 and 52 and divides the carrier into two parts. The partition 54 is preferably secured to the end walls and to the base. The upper end 56 of the central partition extends above the upper edges of the end walls to terminate at a handle portion. The handle portion 56 is provided with a hand hole aperture 58 to facilitate carrying the carrier.

Each side of the carrier on opposite sides of the central partition is provided with a transverse flange 60 arranged to compartmentalize each side. Each flange 60 and each end wall is provided with a flange 62. The flanges 60 are coplanar and form partial side walls designed to prevent canned foods or formula bottles 63 from becoming dislodged from their respective compartments.

The carrier is provided with closure panels 64 and 66 which are hinged to the outside opposite edges of the base 46. Hook tab 68 formed integrally or connected to the panels 64 and 66 are inserted through slots 70 in downwardly projecting ears 71 which are connected to the under surface of the base 46. The closure panels are further provided with right angular cover portions 72 and 74 which when the panels are in a closed position extend towards the handle portion 56 of the central partition.

Suitable clasps or locking means such as the tabs 76 on the handle portion 56 are engageable with detents 78 on the cover portion 72 and 74 to hold the closure panels closed when the carrier is being transported. Each side of the central partition 54 is provided with one or more loops such as 80 and 82 for supporting spoons 84 or other items.

It is understood that where feasible the carrier may be molded of polyethylene or similar material or it may be formed by securing the individual panels, walls, and partitions together in any suitable manner.

In accordance with the patent statutes, I have described the principles of construction and operation of my improvement in baby food carrier, and while I have endeavored to set forth the best embodiment thereof, I desire to have it understood that changes may be made within the scope of the following claims without departing from the spirit of my invention.

I claim:

1. A food container carrier comprising a generally rectangular base portion upon which containers of food may rest and having upwardly extending end walls connected to opposite end edges of said base portion, a central partition secured medially to said base and to said end walls, said partition extending above said end walls to provide a handle and closure panels hinged to the remaining opposite edges of said base portion, said closure panels having cover portions extending towards each other to points adjacent opposite side of said handle portion of said central partition, and side wall portions extending upwardly from said base portion inwardly of said closure panels.

2. The structure of claim 1 and including partition means parallel to said end walls and connecting said central partition to said side walls, said partition means dividing the space between said end walls into cells, and in which said side walls include slots therethrough providing access through said side walls to the lower portion of at least some of said cells.

3. A food container carrier comprising a generally rectangular base portion upon which containers of food may rest having upwardly extending end walls connected to said base portion along opposite end edges thereof, a central partition secured medially to said base portion connecting said end walls extending upwardly above said end walls to form a handle having a hand hole therethrough, close panels hinged to the remaining opposite edges of said base portion, side walls connected to said base and to said end walls inwardly of said closure panels and extending approximately one-half of the height of said end walls, said closure panels having cover portions extending towards said central partition and having handle flanges adjacent and parallel to said handle portion of said central partition said handle flanges having hand holes thereon which are registrable with said hand hole in said handle portion of said central partition when in a closed position of said closure panels.

4. A food container carrier comprising a generally rectangular base portion upon which containers of food may rest and having upwardly extending end walls connected to said base along opposite end edges thereof, a central partition secured medially to said base portion connecting said end walls and extending upwardly above said end walls to form a handle having a hand hole therethrough, closure panels hinged to the remaining edge of said base portion having cover partitions extending towards said central partition and having handle flanges extending adjacent and parallel to said handle portion of said central partition, side walls connected to said base portion and to said end walls extending approximately one-half the height of said end walls, panels extending transversely from said central partition connecting said side walls to said central partition and forming compartments on opposite sides of said central partition, said closure panels having cover portions extending toward said central partition and having handle flanges adjacent to and parallel to said handle portion of said central partition, said handle flange having hand holes therethrough registrable with said hand hole in said handle portion of said central partition.

5. The structure as disclosed in claim 4 and in which said side walls and said base portion including slots providing access to each of said compartments for extracting food containers which are of lesser height than the top edges of said transverse panels and said side walls.

6. The structure of claim 4 and in which said side walls include slots providing access to at least some of said compartments.

References Cited in the file of this patent
UNITED STATES PATENTS

| | | |
|---|---|---|
| 1,983,010 | Spees | Dec. 4, 1934 |
| 2,763,366 | Smith et al. | Sept. 18, 1956 |
| 2,880,918 | Schweikhard | Apr. 7, 1959 |
| 2,948,433 | Fineo | Aug. 9, 1960 |